July 13, 1943. A. F. JOHNSON 2,323,912
COUPLING CONSTRUCTION
Filed April 30, 1940
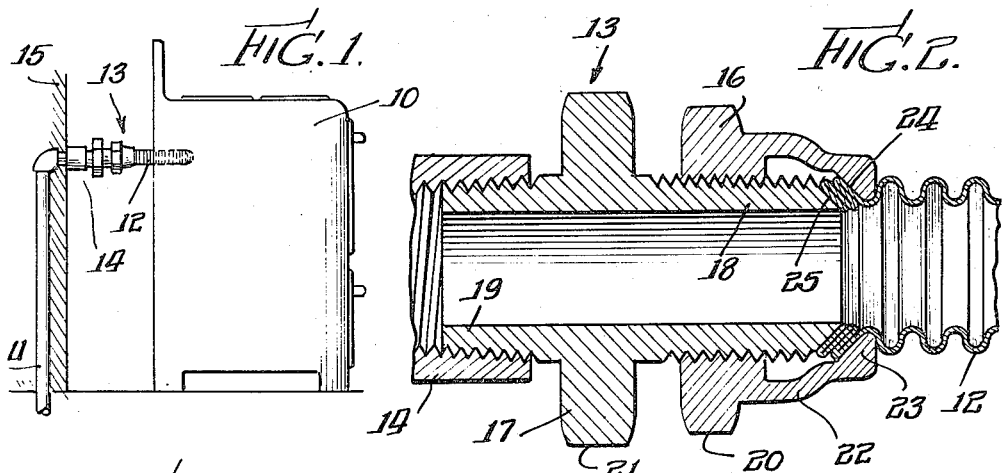
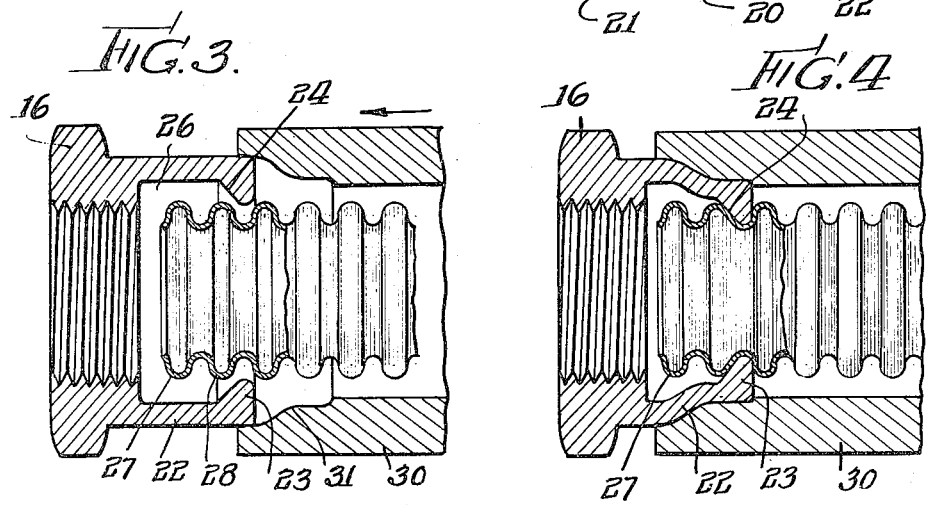
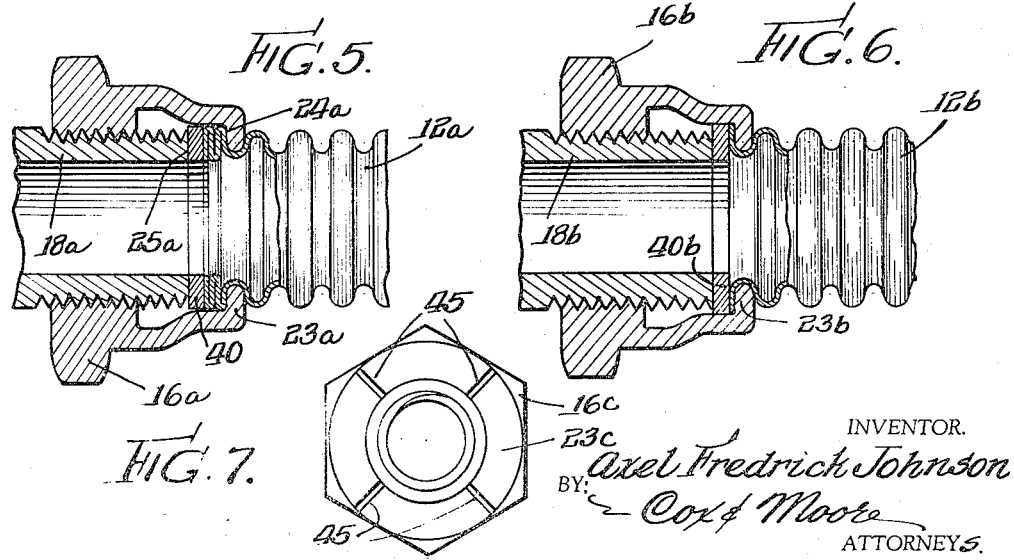
INVENTOR.
Axel Fredrick Johnson
BY Cox & Moore
ATTORNEYS.

Patented July 13, 1943

2,323,912

UNITED STATES PATENT OFFICE 2,323,912

COUPLING CONSTRUCTION

Axel Fredrick Johnson, Chicago, Ill., assignor to Chicago Metal Hose Corporation, Maywood, Ill., a corporation of Illinois Application April 30, 1940, Serial No. 332,486

9 Claims. (Cl. 285—72)

This invention relates to coupling constructions, and to the methods of making the same, and more particularly to coupling constructions for use with flexible metal tubing of the annularly grooved type.

It is an object of the invention to provide a coupling construction, particularly adapted for use with annularly grooved metal tubing, of simplified construction and of improved operating characteristics. More specifically, it is an object of the invention to provide a coupling construction for use with annularly grooved metal tubing or hose which may be swiveled during assembly of the coupling with the hose providing a simplified and compact type of coupling connection, avoiding the use of complicated multiple part structures as well as special swivel devices such as unions or the like.

A further object of the invention is to provide a coupling construction of the foregoing type wherein the metal tubing is positively gripped by the coupling parts, positively precluding axial withdrawal of the tubing from the coupling even when the connection is subjected to relatively high pressures, and wherein a secure and fluid-tight seal is provided between the tubing end and the coupling parts effecting a secure and fluid-tight joint.

A still further object is to provide a coupling construction of the foregoing swivel type wherein the end convolutions of the tubing are axially compressed between relatively movable coupling parts in the assembly of the coupling on the tubing, thereby providing an effective fluid-tight tubing end seal.

In accordance with the principles of the present invention, an integral annular lip portion forming a part of the coupling body is radially contracted into gripping engagement with an annular groove of the tubing whereby to provide a connection between the coupling body and tubing which permits relative swiveling movement between the parts, and at the same time positively grips the tubing and cooperates with an adapter member to effect a secure and fluid-tight end seal for the tubing.

Various other objects, advantages and features of the invention will appear from the following specification when taken in connection with the accompanying drawing wherein certain preferred embodiments of the invention are set forth for purposes of illustration.

In the drawing, wherein like reference numerals refer to like parts throughout:

Fig. 1 is a general illustrative view, diagrammatic in form, of a flexible tubing installation incorporating a coupling connection constructed in accordance with the principles of the present invention.

Fig. 2 is a detail sectional view, on an enlarged scale, of the coupling connection as embodied in the illustrative structure of Fig. 1.

Figs. 3 and 4 are detail sectional views, showing successive method steps in the formation of the coupling connection of Fig. 2, and Figs. 5, 6 and 7 show modified forms of coupling connections constructed in accordance with the principles of the invention.

This application is a continuation-in-part of my copending application, Serial No. 117,740, filed December 28, 1936, and entitled "Coupling and method of application."

Referring more particularly to the drawing, and first to Fig. 1, the numeral 10 indicates any sort of machine or appliance utilizing fluids, either gaseous or liquid, and adapted to be connected to a fluid supply conduit or pipe 11 by means of a flexible metal tubing or hose 12. The coupling construction, constructed in accordance with principles of the present invention and generally indicated by the numeral 13, forms the means of connection between an extension 14 of the pipe 11 and the tubing 12. More specifically, by way of illustrative example, the appliance 10 may be a gas range for ordinary domestic use, and the pipe 11 may be a gas supply pipe embedded in and having its end portion extending outwardly from a wall structure 15. In an installation of this character the pipe 11 with its extension 14 constitutes a substantially rigid pipe connection, and in order to facilitate the application of the appliance 10 to this rigid pipe, the tubing 12 is of the flexible type so as to permit ready alinement of the conduit parts and permit limited movement of the appliance 10 with respect to the rigid pipe extension. In accordance with the present invention the tubing 12 is of the flexible, seamless, annular corrugated type. However, it is to be understood that any form of hose or tubing which is provided with annular grooves and ribs may be utilized in connection with the coupling structure of the invention.

Referring to Fig. 2, showing the coupling in detail, it will be seen that the structure comprises a coupling body member 16 and an adapter 17, the adapter being provided with a threaded extension 18 adapted to be threaded into the central bore of the body member. The adapter is also provided with an oppositely extending threaded projection 19 adapted to be threaded into the end extension 14 of the pipe or conduit 11. The outer circumferential surfaces of the body member and adapter may be polygonally shaped as indicated at 20 and 21 respectively to facilitate the application of wrenches or the like to the parts to effect their relative rotational movements, as will be well understood.

The coupling body member 16 is also provided with a cylindrical portion 22 extending axially along the length of the flexible tubing, and terminating at its outer end in an inturned annular lip or flange 23 extending radially inwardly into one of the annular grooves of the tubing. The inner surface of the lip is tapered or beveled as indicated at 24, and cooperates with a tapered or beveled surface 25 on the outer end of the adapter, the end convolutions of the tubing being compressed between these tapered surfaces, forming a fluid-tight joint.

The manner in which the coupling is assembled upon the tubing will be best understood by reference to Figs. 3 and 4. Initially the coupling body member, which may be of any suitable metal capable of being worked or bent within limits, such as brass, aluminum, steel, etc., is of the shape and contour illustrated in Fig. 3, the cylindrical extending portion 22 of the body member and its lip or flange 23 being of such size as to permit the ready placement of the end convolutions of the flexible tubing within a cavity portion 26 formed within the cylindrical extension. In the particular embodiment illustrated two end convolutions of the tubing 27 and 28 are arranged within the body cavity, the inturned lip 23 being therefore adapted to cooperate with the next to the last tubing groove. It is to be understood, however, that the particular amount of tubing length which is arranged within the cavity may be varied, as desired.

When the parts have been positioned as described, suitable contracting means, such as an axially movable split die 30 having an operating cam contour 31, is brought into engagement with the outer end of the extension 22, contracting the lip 23 into the groove of the tubing as illustrated in Fig. 4. It is to be understood that various means may be employed for contracting the lip, the split die shown being merely illustrative of one such suitable means. As the lip 23 is contracted, the tapered surface 24 thereof causes the slight deformation of the engaged surface of the tubing convolution, as shown in Fig. 4, the contour of the tubing being thus shaped to conform with the surface of the lip. However, the deformation of the tubing is not such as will prevent relative rotation between the tubing and the coupling body member. On the contrary, the contracted lip and the cooperating tubing groove form a swivel connection between the body member and the tubing permitting their relative rotation in the further assembly of the coupling, as will now be described.

After the contracting operation, the coupling body member and the adapter are brought into juxtaposition and rotated relative to each other to cause the extension 18 of the adapter to be threaded into the bore of the body member. During this operation the tapered end surface 25 of the adapter extension engages the tubing end and compresses the end tubing convolutions 27 and 28 between the surfaces 24 and 25, as previously described. Preferably the angularity of the surfaces 24 and 25 correspond to each other so that the tubing convolutions will be gripped between substantially parallel walls. Also the surfaces are finished so as to form an accurate seating contact surface for the tubing, insuring the provision of a fluid-tight joint or connection.

Referring further to Fig. 1, in the application of the coupling of the invention to the installation illustrated, the body member 16 would be contracted into swivel engagement with the tubing 12, as illustrated in Fig. 4, at the factory where the appliance 10 is assembled, where suitable contracting means, such as the split die 30, is available for operation. It is to be understood that the contracting operation may be carried out in the field, if desired, but usually it is preferable to perform this operation in the shop where machine tools are readily available. The body member having already been applied to the tubing, in the field or at the point of installation of the appliance 10, it is accordingly only necessary to assemble the adapter with reference to the fixed pipe extension 14 and the coupling body member, an operation which can be carried out by simple tools, such as wrenches, readily available for field manipulation. More specifically, the adapter is first threaded into the fixed pipe extension 14, and thereafter the body member 16 is threaded onto the adapter extension 18. During this latter operation the body member swivels on the flexible tubing which is in turn prevented from rotation by reason of its connection with the appliance 10. The swivel connection permits the body member to be threaded onto the adapter extension, causing the end tubing convolutions to be collapsed and compressed between the sealing surfaces 24 and 25 into a secure fluid-tight joint.

It will thus be seen that the coupling of the invention provides an exceedingly simple and compact structure for effecting the connection of a piece of flexible metal tubing to a fixed pipe connection in a fluid-tight joint. By reason of the swivel connection between the coupling body and the tubing, the coupling structure may be assembled between two non-rotatable conduits without the use of unions or other special devices. The contracted lip or flange structure 23 not only forms a swivel connection with the tubing, but also cooperates with the sealing surface 25 of the adapter to clamp the tubing convolutions firmly between the lip and the adapter whereby to effect the provision of a fluid-tight connection resistant to high pressure and searching fluids. The positive connection between the contracted lip and the groove of the tubing also positively precludes the axial withdrawal of the tubing from the coupling body in use even though the connection is subjected to high pressures. It is to be noted that the lip when in contracted engagement with the tubing substantially fills the tubing groove forming a maximum area of contact between the tubing and the lip whereby to provide adequate bearing surface during the swiveling operation, particularly during the collapsing and compression of the tubing convolutions.

In Fig. 5 a structure is illustrated essentially similar to that previously described, but wherein the coupling body lip 23a is provided with an inner surface 24a which is vertical rather than tapered, and the end surface 25a of the adapter is also vertically disposed for cooperation therewith. In this instance a washer 40 is also interposed between the end of the adapter and the compressed tubing convolutions. It is to be understood, however, that the use of such washer is optional, depending upon the character of the particular installation. In other words, the washer may be omitted from the construction as illustrated in Fig. 5, or used in a construction as shown in Fig. 2, as may be desired.

In Fig. 6 a structure generally similar to that shown in Fig. 5 is illustrated, except that in this instance the coupling body member lip 23b is compressed into the extreme end groove of the tubing, the extreme end wall section of the tubing therefore being the tubing portion which is clamped between the contracted lip and the adapter end wall.

In Fig. 7 a further modification is illustrated wherein the coupling body member 16c is provided with a series of slots 45 to facilitate the contraction of the annular lip, the coupling body being illustrated in a condition such as shown in Fig. 3, before contraction. The use of slots of this character may be found to be desirable where the coupling body is of a larger size.

It is obvious that various changes may be made in the specific embodiments set forth for purposes of illustration, and in the several method steps described, without departing from the spirit of the invention. Accordingly the invention is not to be limited except as indicated in the following claims.

The invention is hereby claimed as follows:

1. A coupling for attachment on flexible annularly corrugated metal tubing comprising a coupling body having integral annularly arranged wall portions forming a cavity for the reception of an end of corrugated tubing, said annular wall portions having inwardly extending annular lip means formed thereon for engaging corrugated tubing between adjacent corrugations thereof, said wall portions being sufficiently bendable to permit the same to be contracted upon the end of corrugated tubing in said cavity whereby to crimp said lip means in a corrugation of the tubing to secure the coupling in place thereon.

2. A coupling for attachment on flexible annularly corrugated metal tubing comprising a coupling body having integral annularly arranged wall portions forming a cavity for the reception of an end of corrugated tubing, said annular wall portions having inwardly extending annular lip means formed thereon for engaging corrugated tubing between adjacent corrugations thereof, said wall portions being sufficiently bendable to permit the same to be contracted upon the end of corrugated tubing in said cavity whereby to crimp said lip means in a corrugation of the tubing to secure the coupling in place thereon, said annular wall portions being slit at intervals to facilitate the crimping thereof inwardly upon the end of the corrugated tubing.

3. A coupling and an annularly corrugated metal tubing on which said coupling is crimped, the coupling comprising a body providing annularly arranged wall portions defining a cavity for receiving a portion of the corrugated tubing, said annular wall portions having inwardly extending annular lip means formed thereon in position to enter between adjacent corrugations of the tubing, and said wall portions being contracted inwardly upon the corrugated tubing in said cavity whereby the lip means is crimped and interlockingly engaged in a corrugation of the tubing.

4. A coupling and an annularly corrugated metal tubing on which said coupling is crimpingly secured, the coupling comprising a body providing annularly arranged wall portions defining a cavity for receiving a portion of the corrugated tubing, said annular wall portions having inwardly extending annular lip means formed thereon in position to enter between adjacent corrugations of the tubing and said wall portions being contracted inwardly upon the corrugated tubing in said cavity whereby the lip means is interfittingly and slidingly received in a corrugation of the tubing to permit relative rotation of the coupling with respect to the tubing on which it is secured.

5. A coupling construction comprising a coupling body member and a piece of annularly corrugated metal tubing, the coupling body being provided with a cavity adapted to receive an end section of the corrugated tubing and an axially extending threaded aperture communicating with the cavity at one end thereof, the coupling body being provided at the other end of the cavity with an inturned annular lip contracted into gripping engagement with a corrugation in the tubing whereby to provide a connection between the body and tubing preventing relative axial movement, and an adapter member threaded into the threaded aperture of the body member and provided with a clamping end within the body cavity, the end section of the corrugated tubing within the cavity being clamped between the adapter clamping end and the coupling body annular lip whereby to provide a fluid-tight connection for the tubing end.

6. A coupling construction as defined in claim 5 wherein the clamping end of the adapter and the adjacent surface of the inturned annular lip of the body member are provided with corresponding tapers between which the corrugated tubing is clamped.

7. A coupling construction as defined in claim 5 wherein the end section of the corrugated tubing lying within the cavity of the coupling body member comprises at least one tubing convolution, such convolution being collapsed and compressed in clamping engagement between the adapter clamping end and the coupling body annular lip.

8. A coupling construction as defined in claim 5, wherein a washer member is interposed between the clamping end of the adapter member and the end section of the corrugated tubing.

9. A coupling construction as defined in claim 5, wherein the end section of the corrugated tubing within the cavity of the coupling body and clamped between the adapter and the coupling body annular lip comprises a single tubing wall thickness.

AXEL FREDRICK JOHNSON.